INVENTOR
W. B. MACURDY
BY James W. Falk
ATTORNEY

United States Patent Office 3,428,947

Patented Feb. 18, 1969

3,428,947

SCANNING CIRCUIT FOR SCANNING ALL OF A GROUP OF POINTS IF ONE POINT HAS A CHANGE OF STATE

William B. Macurdy, Fair Haven, N.J., assignor to Bell Telephone Laboratories, Incorporated, New York, N.Y., a corporation of New York Filed Mar. 31, 1965, Ser. No. 444,128
U.S. Cl. 340—147 4 Claims
Int. Cl. H04q 1/00

ABSTRACT OF THE DISCLOSURE

A scanning arrangement for a data processor is disclosed wherein a group of binary scan points is scanned only when there is a change-of-state of a scan point within that group. This is accomplished by connecting a number of devices, each sensitive to a change-of-state in either direction of any connected scan point, to all of the scan points within a respective scan point group. Scanning of these devices informs the data processor if there has been any scan point change-of-state and, if so, in which scan point group. The data processor may then scan that particular group in the usual manner.

Figure 1:
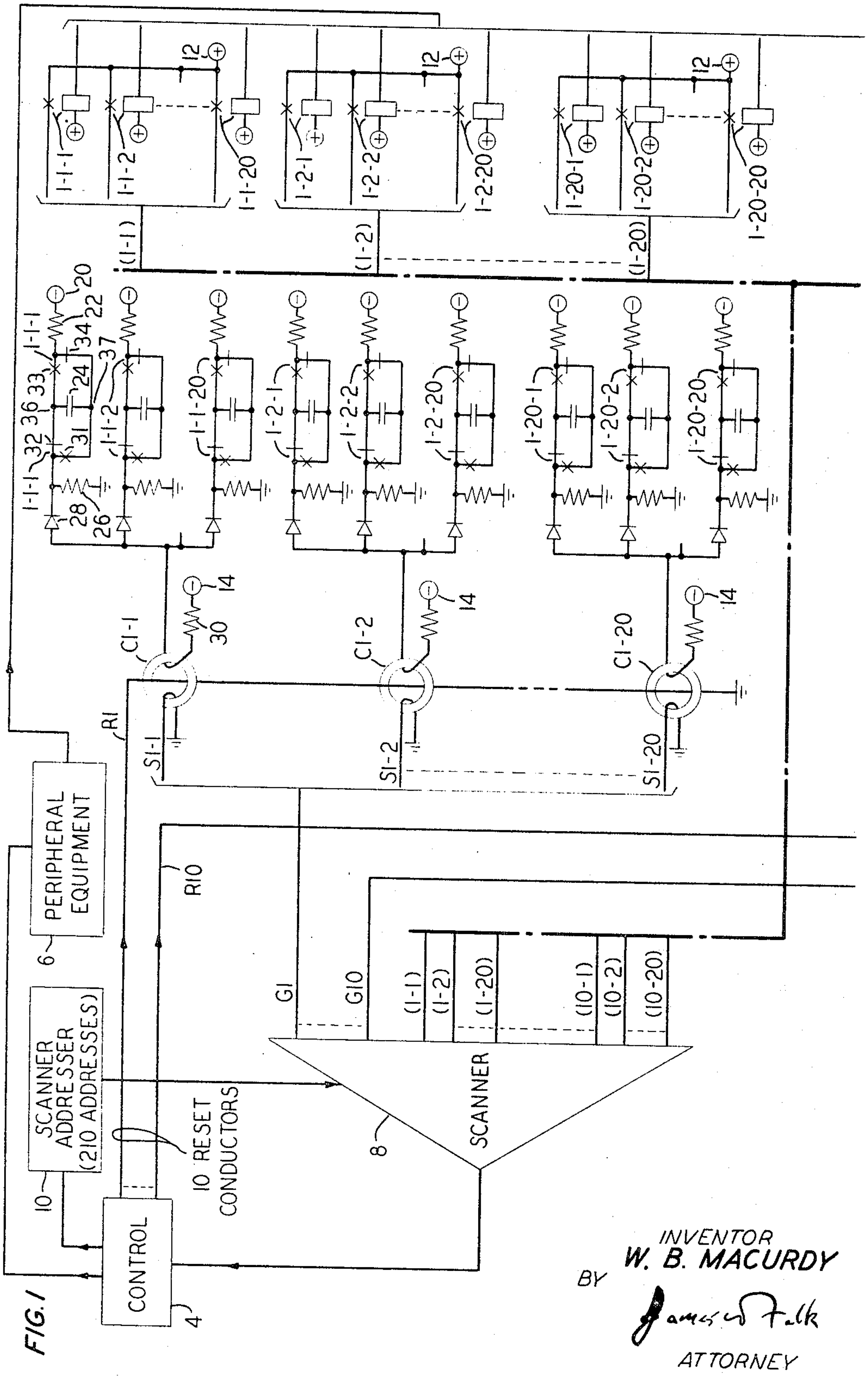

This invention relates to data processors and more particularly to scanning arrangements for use therein.

In many present-day data processors the system control, in order to determine the required system action, must be made aware of the states of various elements in the peripheral equipment. The peripheral equipment may include a variety of scan points. The control scans the scan points to determine the states of the respective elements in the peripheral equipment and in accordance with these states the control transmits appropriate control signals to govern the system operation. The system control deermines which particular scan points are to be scanned at any given time. An address may be sent to a scanner which scans the respective scan point, or group of scan points, and transmits a scanner answer word to the control, the scanner answer word representing the state of the particular scan point or group of scan points. In large scale data processors because there are so many scan points which must be scanned a considerable amount of time is spent by the control for scanning purposes. In some systems the control spends more than half its time in scanning.

It is a principal object of this invention to provide a highly efficient scanning arrangement whereby the time spent by the control unit of a data processor for scanning purposes may be materially reduced.

My invention utilizes a prior art scanning technique shown for example in the Doblmaier et al. application Ser. No. 334,875, filed Dec. 31, 1963. In the telephone system disclosed in the Doblmaier et al. application scan points are not examined on an individual basis. The control transmits an address to the scanning equipment and the scanner scans a group of scan points. Each scan point can be in one of two states. A scanner answer word is formed with each bit in the word representing the state of a respective scan point in the group. The bit is a 1 if the scan point is in the first state and it is a 0 if the scan point is in the second state. The scanner answer word is transmitted to the control. Suppose the scan is of scan points representing the states of telephone lines, a 1 represents a service request, and a 0 indicates that the line is still on-hook. The control includes a mechanism for determining if all bits in the scanner answer word are 0's. If they are the control in just one step has determined that no further action need be taken for an entire group of lines and the scanning may proceed to the next group of lines. This scanning scheme is highly advantageous because most of the time no lines in a group will be requesting service and by scanning in groups it is possible to effectively scan many lines with only one scan. If some of the bits in the scanner answer word are 1's the lines requesting service may be identified by the respective bit positions in the scanner answer word containing 1's.

Another type of scan is that directed to change-of-state information, e.g., dial pulse scanning. Here the scan point represents the absence or presence of a dial pulse. A 1 may represent a pulse and a 0 may represent an interpulse interval. The scanner answer word is compared with a "last look" word stored in the system memory. If a change has occurred in any scan point since the last scan the change must be noted. The "last look" may be exclusive-ORed with the scanner answer word and the resulting word will contain a 1 only in those bit positions whose respective lines have changed state. Again, the scanning arrangement is highly desirable because if no lines have changed state since the previous scan the resulting word derived by the control contains all 0's and the scanning may proceed to the next group of lines.

In the Doblmaier et al. system the scanner answer word is 16 bits in length and consequently most of the time 16 scan points can be scanned simultaneously. However very often the states of many more than 16 scan points may have remained unchanged since the previous scan and were it possible to scan all of these scan points simultaneously a much more efficient scanning arrangement would result. However the maximum number of scan points which can be scanned at the same time is limited by the length of the scanner answer word. The scanner answer word in the illustrative embodiment of my invention is 20 bits in length. Four hundred scan points are scanned simultaneously however rather than only 20. If no scan point has changed state the scanning proceeds to the next group of 400 scan points and effectively 400 scan points have been scanned simultaneously. If one or more of the scan points has changed state, individual scans of groups of 20 scan points each in the overall group of 400 are performed to identify the particular changed scan points.

In my invention each of the 400 scan points in a group is coupled to the scanner. The scan points may be scanned in groups of 20 since the scanner answer word is 20 bits in length. However the scan points are not scanned directly in the first instance. Each group of 20 scan points is associated with a single magnetic core. The core is set if any one or more of the 20 respective scan points changes state in either direction. The 20 cores associated with the 400 scan points are each coupled to a respective one of an additional 20 scan points. The 400 scan points are scanned in the first instance by applying a reset pulse to all 20 cores. If a core is initially reset it does not switch state when the reset pulse is applied and the respective one of the 20 additional scan points is deactivated. However if a core switches from the set state to the reset state the respective additional scan point is activated. The address transmitted to the scanner is that represening the 20 additional scan points, and a particular bit in the scanner answer word is a 0 if the respective core scan point is deactivated and it is a 1 if the respective core scan point is activated.

A core is initially set when one of the scan points in the respective group of 20 changes state in either direction. A 1 in the scanner answer word is an indication that at least one scan point in the group of 20 associated with the core represented by the 1 bit has changed state. The scanner determines from the scanner answer word which group or groups of 20 scan points contain scan points which have changed states. The control then causes these particular groups of scan points to be scanned individually to determine the particular states of the scan points.

Twenty groups of scan points are represented by the numbers 1 through 20, and 20 individual scan points in each group are also represented by the numbers 1 through 20. Suppose that since the previous scan three scan points have changed states. Scan point 4 in group 2 has changed from the 1 to the 0 state, scan point 1 in group 7 has changed from the 1 to the 0 state, and scan point 20 in group 7 has changed from the 0 to the 1 state. Because scan points in groups 2 and 7 have changed states, cores 2 and 7 are initially set. When the 20 cores are scanned only cores 2 and 7 switch to the reset state and consequently the 20-bit scanner answer word contains all 0's except for 1's which appear in bit positions 2 and 7. Upon receipt of the scanner answer word the control causes scan point group 2 and scan point group 7 to be scanned individually. First, scan point group 2 is scanned. The control thus far has no way of knowing which scan points associated with core 2 have changed states. However when scan point group 2 is scanned the control can determine which scan points have changed and in which directions. If change-of-state information is desired, after the exclusive-OR operation the resulting word will contain a 1 only in bit position 4. If state information rather than change-of-state information is desired the control can examine directly the bits in the scanner answer word to determine the states of the scan points. Then scan point group 7 is scanned. If state information is desired the scanner can examine the bits in the scanner answer word individually. If change-of-state information is desired the scanner answer word may be exclusive-ORed with the "last look" word and the resulting word will contain all 0's except for bits 1 and 20 both of which will be 1's. Thus only three individual scans are required, one of the cores and two of individual groups of scan points, for scanning 400 scan points. Very often no scan point in the entire group of 400 will have changed state since the previous scan. When the core are first scanned and the scanner answer word contains all 0's, the scan may proceed to the next group of 400 scan points and effectively 400 scan points have been scanned in a single scan even though the scanner answer word contains only 20 bits.

In the illustrative embodiment of my invention a core is set if any one of the respective 20 scan points changes state in either direction. The invention is of course applicable to the simpler case where state information alone is always desired; here, a core might be set only if a scan point changes state in a particular direction. However in many systems change-of-state information is required. The scanner answer word resulting from the scan of a group of 20 scan points represents state information since each bit in the scanner answer word represents the state of a respective scan point. Each bit in the scanner answer word when the group of 20 cores is scanned however represents change-of-state information since a core is set when any one of the 20 respective scan points changes state in either direction. Thus in a system where changes in either direction must be detected, a core (or equivalent device) must be set when one of the 20 respective scan points switches from either state to the other. The setting of the core by 20 respective scan points in this manner in the illustrative embodiment of the invention is accomplished by the use of a unique charging circuit in which a capacitor is switched in the circuit each time the state of the respective scan point changes.

It is a feature of this invention to provide a scanner for scanning groups of scan points simultaneously.

It is another feature of this invention to provide a group of devices, each associated with a group of scan points, and each being set when one or more of the respective scan points changes state in either direction.

It is another feature of this invention to scan a group of scan point groups in the first instance by scanning the respective group of devices.

It is still another feature of this invention to scan individually any group of scan points whose associated device has been determined to be in the set state when the respective group of devices is scanned in the first instance.

Figure 2:
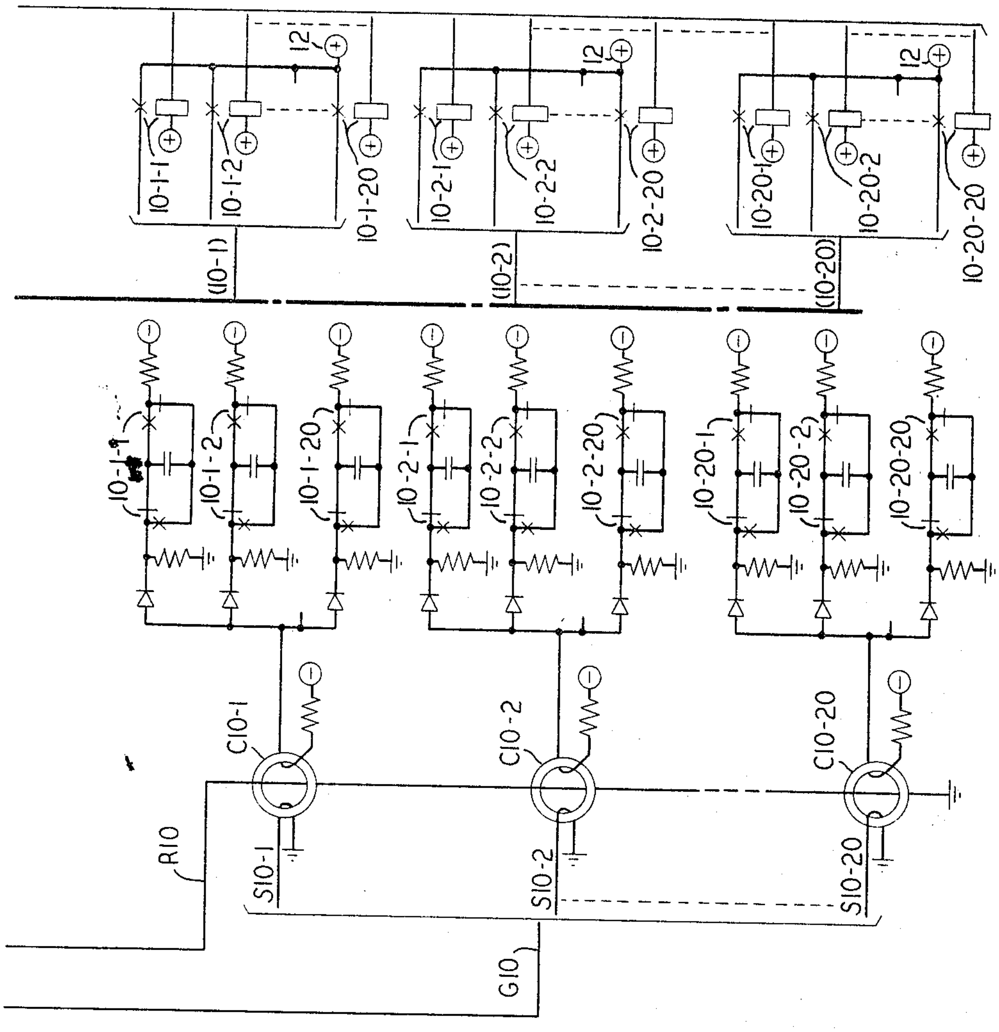

Further objects, features and advantages of the invention will become apparent upon consideration of the following detailed description in conjunction with the drawing in which FIGS. 1 and 2, with FIG. 1 being placed to the left of FIG. 2, together are a schematic representation of an illustrative embodiment of my invention.

In the drawing control 4, peripheral equipment 6, scanner 8 and scanner addresser 10 are shown only symbolically since these elements are well known in the art. Control 4 transmits command signals to peripheral equipment 6 to govern the desired system operation. To determine the states of various elements in the peripheral equipment control 4 operates scanner addresser 10. The scanner addresser transmits a particular address to scanner 8, the address representing the particular scan points whose states must be determined by the control.

In the illustrative embodiment of the invention there are 4,000 elements in the peripheral equipment whose states must be determined at various times by control 4. The 4,000 elements are arranged in ten sets of 400 each. Each set of 400 is in turn separated into 20 groups of 20 elements each. Each element controls the operation of a respective one of the 4,000 relays 1–1–1 through 10–20–20. The first number in each relay designation represents one of the ten sets of 400 relays each. The second number represents one of the 20 groups of relays in each set of 400. The third number represents one of 20 relays in each group of 20. For example, relay 10–2–20 is the 20th relay in the second group of 20 relays in the 10th set of 400 relays. When an element is in a first state the respective relay is energized, the element causing a ground potential to be applied to one end of the relay winding. When the element is in the second state the relay is de-energized.

Each relay controls the energization of a respective scan point. There are thus 4,000 scan points representing the states of 4,000 elements in the peripheral equipment. Each relay controls a pair of normally open contacts which connect a source 12 to a respective scan point in scanner 8. For example, when relay 1–1–20 is energized a respective pair of contacts are closed and positive source 12 activates the respective scan point. The 4,000 scan points are arranged in groups of 20. Group (1–1) comprises the 20 scan points in the first of the 20 groups included in the first set of 400 scan points. Since there are 4,000 scan points there are 200 groups of 20 scan points each. Any one of 200 addresses may be transmitted to scanner 8 for identifying one of the groups (1–1) through (10–20). The scanner answer word transmitted from scanner 8 to control 4 comprises 20 bits. The value of each bit is determined by the state of a respective scan point in the group of 20 being scanned. If an element in the peripheral equipment is in the first state, the respective relay is energized, the respective scan point is activated and the respective bit in the scanner answer word is a 1. If the element is in the second state the respective relay is de-energized, the associated scan point is deactivated and the respective bit in the scanner answer word is a 0.

As in the prior art a group of scan points may be scanned simultaneously to great advantage. Suppose for example the control must determine which scan points in a group of 20 are in the 1 state. The control includes a mechanism well known in the art for examining a 20-bit scanner answer word and detecting if there are any 1's in it. If all bits in the scanner answer word are 0's the control can determine in a single step that none of the 20 scan points of concern are in the 1 state. If the control determines that the scanner answer word does not consist of 20 0's the bits in the word are examined on an individual basis to determine which of them are 1's. In this manner the control may determine which of the respective scan points are in the 1 state. The major advantage of group scanning is that if there has been no change in the states of all scan points in a group all of the scan points may be scanned effectively in a single step.

To scan 400 scan points 20 scans are required even if none of the 400 scan points have changed state since the previous scan. A considerable amount of scanning time could be saved were it possible to scan the 400 scan points simultaneously especially if in the particular system all of the scan points in a group of 400 will not have changed states since the previous scan most of the time. In the prior art however the number of scan points which may be scanned simultaneously has been limited by the size of the scanner answer word, e.g., 20 bits in the illustrative embodiment of the invention, since one bit is required to represent the state of each scan point. In my invention however the number of scan points which may be scanned simultaneously is considerably greater than the number of bits contained in the scanner answer word.

Ten groups, G1 through G10, of 20 cores each are provided. Cores C1– are contained in group G1 and cores C10– are contained in group G10. The second number in each core designation represents a group of 20 respective relays (or elements in peripheral equipment 6, or scan points). For example, core C1–2 is associated with the 20 relays 1–2–1 through 1–2–20. All cores are initially in the reset state with the magnetizations being in the counter-clockwise direction. When any relay switches state in either direction a current flows from source 14 through the right-most winding of the respective core to switch the core to the set state with its magnetization in the clockwise direction. For example, if relay 1–2–2 was initially de-energized and is suddenly energized core C1–2 is switched to the set state. If relay 1–2–20 was initially energized and suddenly becomes de-energized core C1–2 is similarly switched to the set state. It makes no difference how many relays switch states between successive scans of core C1–2, nor does it matter in which directions the states of the relays change. Any change in the state of at least one relay causes core C1–2 to be set. Similar remarks apply to the other 199 cores.

Since each core is set when at least one of the 20 respective relays changes state in either direction the cores represent change-of-state information. Four hundred scan points are scanned in the first instance by scanning the 20 respective cores. Ten reset conductors R1 through R10 are extended from control 4 to the ten respective groups of cores. Suppose it is desired to scan the 400 scan points in set 1. A negative potential is applied by control 4 to conductor R1 and current flows upward in the conductor through the 20 cores C1–1 through C1–20. This current places each core in the reset state. Any core previously in the set state on switching to the reset state causes a pulse to be induced in the respective one of sense conductors S1–1 through S1–20. The sense conductors are connected to respective additional scan points in scanner 8. When cores C1–1 through C1–20 are being scanned the address transmitted from scanner addresser 10 to scanner 8 is that identifying the 20 scan points in group G1. Each bit in the scanner answer word is a 1 only if a pulse is induced in the respective one of the sense conductors. If none of the 400 relays 1–1–1 through 1–20–20 have changed state since the previous scan of cores C1–1 through C1–20 none of the cores switches from the set state to the reset state when conductor R1 is pulsed. The scanner answer word contains 20 0's and control 4 can immediately determine that none of the 400 relays have changed state and that the scan may proceed to the next group of 400 scan points, which are also scanned in the first instance by examining the states of the respective group of 20 cores. If, on the other hand, one or more of relays 1–1–1 through 1–20–20 have changed states one or more of the bits in the scanner answer word representing the states of the scan points in group G1 will be 1's. Each bit in the word represents 20 respective relays. Suppose, for example, bits 2 and 20 in the scanner answer words are 1's. These bits are associated with respective relay groups 1–2–1 through 1–2–20 and 1–20–1 through 1–20–20. Control 4 transmits information to scanner addresser 10 to perform two scans, the first of group (1–2) and the second of group (1–20). The two respective scanner answer words will enable control 4 to identify which relays in the first set of 400 have changed states and the particular states of these relays. After these two scans the next group of 20 cores are scanned to determine if any relays in the next set of 400 have changed states since the previous scan.

The major advantage of the scanning arrangement of my invention is that the number of scan points which may be scanned simultaneously is greater than the number of bits in the scanner answer word. In the illustrative embodiment of the invention if none of 400 scan points have changed state since the previous scan all of them may be scanned in a single cycle by the use of a scanner answer word having only 20 bits. Even if some of the scan points have changed states it is not necessary to scan all 20 of the individual groups in the set of 400. By examining the scanner answer word representing the states of the respective cores it is possible to determine the particular groups of 20 scan points each in the set of 400 which must be scanned individually to determine the required information. The scanning circuitry of my invention is only slightly more complex than that found in the prior art. The scanner addresser 10 must be capable of identifying 210 different addresses, 200 representing individual groups of 20 scan points each and 10 representing groups G1 through G10, rather than only 200 as in the prior art. Ten reset conductors and 400 cores must also be provided. However the expense of the additional equipment is more than outweighed by the great time savings afforded. Because 400 scan points may be scanned simultaneously rather than only 20 the control is made free for other purposes.

In order for control 4 to determine when an individual scan of a group of 20 scan points is required the respective core must be set when any one of the 20 respective relays changes state in either direction. Thus when one of relays 1–1–1 through 1–1–20 is first energized a current must flow from left to right in the rightmost winding of core C1–1. When the relay subsequently de-energizes a second current pulse must flow in the same direction. A unique switching circuit is associated with each relay for enabling the switching of the relay in either direction to control the same direction current pulse through the respective core winding.

Consider, for example, relay 1–1–1 and its contacts 31, 32, 33, 34. Initially the relay is de-energized and the states of the four pairs of contacts 31, 32, 33, and 34 in the respective charging circuit are as shown in the drawing. The potential of source 20 is the same as that of source 14, e.g., —48 volts. The lower terminal 37 of capacitor 24 is connected through the normally closed contacts 34 and resistor 22 to source 20. This terminal is thus at —48 volts. The upper terminal 36 of the capacitor is connected through the normally closed contacts 32 and resistor 26 to ground. The upper terminal 36 of capacitor 24 is thus at ground potential and diode 28 is reverse biased. A 48-volt potential difference appears across the capacitor terminals. When the relay is energized the four pairs of contacts in the respective charging circuit switch states. The terminal 36 of capacitor 24 is connected through normally open, but now closed, contacts 33 and resistor 22 to source 20. Terminal 36 of the capacitor is thus now at —48 volts rather than ground potential. The voltage across a capacitor may not change instantaneously. The terminal 37 of the capacitor is initially 48 volts more negative than the lower terminal. When terminal 36 is first connected to source 20 and placed at —48 volts, terminal 37, which is 48 volts more negative than the terminal 36, jumps to —96 volts. This terminal 36 is now connected through closed contacts 31 on relay 1–1–1 to the junction of diode 28 and resistor 26. Since the potential of this junction is now —96 volts and the anode of the diode is connected through resistor 20 to source 14, the diode is forward biased. Current flows from the —48 volt potential source 14 through resistor 30 and diode 28. The current from source 14 switches core C1–1 to the set state. The current through diode 28 flows up through now closed contacts 31 on relay 1–1–1, through capacitor 24, and through the other pair of now closed contacts 33 on the relay and resistor 22 to source 20. As the capacitor charges the junction of diode 28 and resistor 26 rises in potential from —90 volts. When the junction rises to —48 volts diode 28 ceases to conduct and the current pulse which sets cores C1–1 is terminated. The junction does not remain at —48 volts however. At the same time that current flows through diode 28 to charge the capacitor, current also flows from ground through resistor 26 to charge the capacitor. This current continues to flow until the terminal 37 of capacitor 24 is at ground potential. At this time the voltage drop across resistor 26 is 0 and current ceases to flow. Terminal 37 of capacitor 24 is now at ground potential and terminal 36, connected through now closed contacts 33 on relay 1–1–1 and resistor 22 to source 20, is at —48 volts. It will be observed that a potential difference of 48 volts appears across the capacitor terminals as it did before relay 1–1–1 was first energized. However the charge is now reversed and terminal 37 is positive with respect to terminal 36. The capacitor remains charged in this opposite direction as long as relay 1–1–1 remains energized. When core C1–1 is scanned it is reset. It must be set once again when relay 1–1–1 de-energizes.

When relay 1–1–1 releases the four respective pairs of contacts in the charging circuit switch to the states shown in the drawing. Terminal 37 of capacitor 24 is now connected through resistor 22 to the —48 volt source 20. Terminal 36 which is 48 volts more negative than terminal 37 thus jumps to —96 volts. This terminal is now connected to the junction of diode 28 and resistor 26. Since the cathode of the diode is now at —96 volts and the anode is connected through resistor 30 to the —48 volt source 14, the diode is forward biased and current flows once again from source 14 to set core C1–1. The junction of diode 28 and resistor 26 rises in potential as capacitor 24 charges. When the junction reaches 0 volt in potential diode 28 is reverse biased and the setting pulse is terminated. While current is flowing through diode 28 to charge capacitor 24 current is also flowing through ground to resistor 26 to charge the capacitor. This current continues to flow, however, after the setting pulse is terminated. The current through resistor 26 continues to flow until terminal 36 of capacitor 24 is at ground potential. At this time the voltage drop across resistor 26 is 0 and current flowing in the charging circuit ceases. Terminal 36 of the capacitor is at ground potential and terminal 37, connected through normally closed contacts 34 and resistor 22 to source 20, is at —48 volts. The voltage across the capacitor has thus switched direction once again. Terminal 37 is more negative than terminal 36 and the charging circuit is prepared to set core C1–1 once again when relay 1–1–1 is energized. The unique charging circuit associated with each relay enables the respective core to be set with its magnetization in the clockwise direction when the relay switches state in either direction.

The principles of my invention have been described with reference to a particular embodiment. Numerous modifications are possible. For example, it may be determined in a particular system that most of the time no scan point in a group of 8,000 will change state between successive scans. It may be possible to provide a third level of scan point multiplying. An additional 20 cores may be provided with each of these cores being set if any one of a respective 20 cores in a group such as G1 switches state when a reset pulse is applied to conductor R1. The 8,000 scan points may be scanned in the first instance by examining the 20-bit scanner answer word each of whose bits is a 1 only if the respective core in the additional group of 20 switches to the reset state when a reset pulse is applied. If any bit in the scaner aswer word is a 1 the respective group of 20 cores such as G1 is then examined. (The information in the groups of cores such as G1 must not be destroyed when they are examined for the purpose of setting the respective one of the 20 new cores.) By examining the bits in the scanner answer word the respective groups of relays which contain relays having changed states may be identified, and these groups of relays (scan points) may then be scanned individually. Although an additional multiplying level is required a very large number of scan points may be scanned simultaneously and the scanning sequence is very efficient particularly if most of the time no scan points in a group of 8,000 changes state between successive scans. Thus it is to be understood that numerous modifications may be made in the illustrative embodiment of the invention and other arrangements may be devised without departing from the spirit and scope of the invention.

What is claimed is:

1. A scanning circuit for a data processor comprising a first number of bistable devices, a second number of magnetic cores, a third number of scan points, the sum of said first and second numbers being equal to said third number, means for controlling the states of a first number of said scan points in accordance with the states of respective ones of said bistable devices, means for controlling the states of a second number of said scan points in accordance with the switching of the remanent magnetization in respective ones of said cores, means for coupling groups of said bistable devices to respective ones of said cores for setting said cores in a first magnetization state if one of the coupled bistable devices switches state, said coupling means including a respective first conductor coupled to each core and means for controlling a unidirectional current pulse in said first conductor to set the respective core in said first magnetization state when any of the bistable devices in the respective group changes state in either direction, means for selectively applying a current pulse to a group of said cores for switching the remanent magnetization of said cores to a second state, said current pulse applying means including unique conductors coupled to respective groups of said cores for switching said cores to said second magnetization state when a current pulse is applied thereto, and a respective second conductor coupled between each of said cores and the respective scan point in said second number of scan points, and means for scanning the group of said scan points in said second number of scan points whose states are controlled by remanent magnetization switching in the group of cores to which said current pulse is applied and responsive to the detection of the switching of the remanent magnetization in any of said cores for scanning the group of scan points in said first number of scan points whose respective group of bistable devices is coupled to said any core.

2. A scanning circuit in accordance with claim 1 wherein each of said bistable devices is a relay and each of said coupling means further includes means connecting the first conductor coupled to the respective one of said cores to a number of charging circuits equal in number to the number of relays in the respective group coupled to the core, each of said charging circuits including a capacitor which is switched back and forth between two positions in the charging circuit in accordance with the state of a respective relay.

3. A unidirectional pulsing circuit for setting the remanent magnetization of a magnetic core in a predetermined state comprising a conductor coupled to said core;

a first source of potential connected to one end of said conductor; a diode connected to the other end of said conductor; a charging circuit including a resistor, a capacitor and a second source of potential connected to said diode; relay means for reversing the position of said capacitor in said charging circuit dependent upon the state of said relay means; and a third source of potential and resistor means for charging said capacitor together with said first and second sources of potential responsive to the switching of the state of said relay means.

4. A unidirectional pulsing circuit for setting the remanent magnetization of a magnetic core in a predetermined state comprising a conductor coupled to said core, a charging circuit connected to said conductor for controlling a unidirectional current flow therethrough, said charging circuit including a capacitor, means for reversing the position of said capacitor in said charging circuit, and means connected to said capacitor for charging said capacitor responsive to the operation of said reversing means.

References Cited

UNITED STATES PATENTS

| | | | |
|---|---|---|---|
| 2,449,077 | 9/1948 | Lindenblad | 307—108 |
| 3,133,267 | 5/1964 | White | 340—147 |
| 3,187,312 | 6/1965 | Ulrich | 340—174 |
| 2,585,904 | 2/1952 | Busch. | |

DONALD J. YUSKO, *Primary Examiner.*